(12) United States Patent
Xie et al.

(10) Patent No.: US 11,263,261 B2
(45) Date of Patent: Mar. 1, 2022

(54) METHOD AND SYSTEM FOR CHARACTERISTIC-BASED VIDEO PROCESSING

(71) Applicant: ALIBABA GROUP HOLDING LIMITED, Grand Cayman (KY)

(72) Inventors: Shaolin Xie, San Mateo, CA (US);
Minghai Qin, San Mateo, CA (US);
Yen-kuang Chen, San Mateo, CA (US);
Tae Meon Bae, San Mateo, CA (US);
Qinggang Zhou, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/791,930

(22) Filed: Feb. 14, 2020

(65) Prior Publication Data
US 2021/0258588 A1 Aug. 19, 2021

(51) Int. Cl.
| | |
|---|---|
| *G06F 16/783* | (2019.01) |
| *H04N 19/23* | (2014.01) |
| *H04N 19/17* | (2014.01) |
| *H04N 19/115* | (2014.01) |
| *G06F 16/75* | (2019.01) |
| *G06F 16/71* | (2019.01) |
| *G06F 16/78* | (2019.01) |
| *G06F 16/70* | (2019.01) |

(Continued)

(52) U.S. Cl.
CPC .......... *G06F 16/7847* (2019.01); *G06F 16/70* (2019.01); *G06F 16/71* (2019.01); *G06F 16/73* (2019.01); *G06F 16/75* (2019.01); *G06F 16/78* (2019.01); *G06F 16/783* (2019.01); *G06F 16/7864* (2019.01); *H04N 19/115* (2014.11); *H04N 19/17* (2014.11); *H04N 19/23* (2014.11); *G06F 16/784* (2019.01); *G06F 16/786* (2019.01); *G06F 16/7837* (2019.01); *G08B 13/19667* (2013.01)

(58) Field of Classification Search
CPC .... H04N 19/103; H04N 19/12; H04N 19/157; H04N 19/20; H04N 19/174; G06F 16/70; G06F 16/71; G06F 16/73; G06F 16/75; G06F 16/78; G06F 16/783; G06F 16/7847; G06F 16/7864; G08B 13/19667
See application file for complete search history.

(56) References Cited

U.S. PATENT DOCUMENTS

| | | | |
|---|---|---|---|
| 8,687,702 B2 * | 4/2014 | Schmit | H04N 19/17 375/240.24 |
| 9,118,912 B2 * | 8/2015 | Bhagavathy | H04N 19/167 |
| 9,445,089 B2 * | 9/2016 | Ono | H04N 19/17 |

(Continued)

*Primary Examiner* — David N Werner
(74) *Attorney, Agent, or Firm* — Finnegan, Henderson, Farabow, Garrett & Dunner, LLP

(57) ABSTRACT

A method and apparatus for characteristic-based video processing include: in response to receiving a region of a picture of a video sequence, determining a characteristic in the region, the region being independent of other regions of the picture for video coding; determining a class associated with the region based on the characteristic, the class being selected from a plurality of classes; and encoding the region using a parameter set associated with the class, the parameter set being selected from a plurality of parameter sets for video coding at different quality levels.

20 Claims, 10 Drawing Sheets

(51) Int. Cl.
    *G06F 16/73*     (2019.01)
    *G08B 13/196*     (2006.01)

(56) References Cited

U.S. PATENT DOCUMENTS

| | | | |
|---|---|---|---|
| 9,756,570 B1* | 9/2017 | Ramachandra | H04N 19/132 |
| 10,313,692 B2* | 6/2019 | Liu | H04N 19/132 |
| 2004/0070594 A1* | 4/2004 | Burke | G06F 16/78 |
| | | | 715/716 |
| 2004/0125204 A1* | 7/2004 | Yamada | H04N 19/124 |
| | | | 348/97 |
| 2009/0324113 A1* | 12/2009 | Lu | H04N 19/103 |
| | | | 382/234 |
| 2011/0072466 A1* | 3/2011 | Basso | G06F 16/739 |
| | | | 725/47 |
| 2011/0164677 A1* | 7/2011 | Lu | H04N 19/11 |
| | | | 375/240.02 |
| 2011/0274355 A1* | 11/2011 | Oami | G06F 16/7847 |
| | | | 382/190 |
| 2012/0082227 A1* | 4/2012 | Perera | H04N 19/527 |
| | | | 375/240.16 |
| 2014/0019474 A1* | 1/2014 | Yamagishi | H04N 21/44008 |
| | | | 707/769 |
| 2014/0211842 A1* | 7/2014 | Zhao | H04N 19/12 |
| | | | 375/240.02 |
| 2016/0232233 A1* | 8/2016 | Hendry | H04N 21/85406 |
| 2017/0302918 A1* | 10/2017 | Mammou | H04N 19/162 |
| 2019/0045195 A1* | 2/2019 | Gokhale | H04N 19/137 |
| 2019/0045198 A1* | 2/2019 | Mahdi | H04N 19/109 |

* cited by examiner

METHOD AND SYSTEM FOR CHARACTERISTIC-BASED VIDEO PROCESSING

TECHNICAL FIELD

The present disclosure generally relates to video data processing, and more particularly, to methods, apparatuses, and systems for characteristic-based video processing.

BACKGROUND

High-definition (HD) videos (e.g., having a resolution of 1920×1080 pixels) are gaining popularity in various applications of video compression, such as online video streaming, video conferencing, or video surveillance. A software or hardware video encoder (e.g., H.264/AVC, H.265/HEVC, or the like) can encode raw video data (e.g., pictures or frames) captured by a camera into a compressed video bitstream under a bitrate that reflects the number of bits conveyed or processed per unit time.

Video surveillance applications are increasingly and extensively used in many application scenarios (e.g., security, traffic, environment monitoring, or the like), and the numbers and resolutions of the surveillance devices keep growing rapidly. Many video surveillance application scenarios prefer to provide HD videos to users to capture more information, which has more pixels per frame to capture such information. However, an HD video bitstream can have a high bitrate that demands high bandwidth for transmission and large space for storage. For example, a surveillance video stream having an average 1920×1080 resolution can require a bandwidth as high as 4 Mbps for real-time transmission. Also, the video surveillance generally monitors 7×24 continuously, which can greatly challenge a storage system, if the video data is to be stored. The demand for high bandwidth and large storage of the HD videos become a major limitation to its large-scale deployment in video surveillance.

SUMMARY

Embodiments of this disclosure provide methods, apparatus, and apparatus for characteristic-based video processing.

In an aspect, a non-transitory computer-readable storage medium is provided. The non-transitory computer-readable storage medium stores a set of instructions that are executable by one or more processor of a device to cause the device to perform a method of: in response to receiving a region of a picture of a video sequence, determining a characteristic in the region, the region being independent of other regions of the picture for video coding; determining a class associated with the region based on the characteristic, the class being selected from a plurality of classes; and encoding the region using a parameter set associated with the class, the parameter set being selected from a plurality of parameter sets for video coding at different quality levels.

In another aspect, an apparatus is provided. The apparatus includes a memory configured to store instructions and a processor coupled to the memory and configured to execute the instructions to cause the apparatus to: in response to receiving a region of a picture of a video sequence, determine a characteristic in the region, the region being independent of other regions of the picture for video coding; determine a class associated with the region based on the characteristic, the class being selected from a plurality of classes; and encode the region using a parameter set associated with the class, the parameter set being selected from a plurality of parameter sets for video coding at different quality levels.

In another aspect, a computer-implemented method is provided. The method includes: in response to receiving a region of a picture of a video sequence, determining a characteristic in the region, the region being independent of other regions of the picture for video coding; determining a class associated with the region based on the characteristic, the class being selected from a plurality of classes; and encoding the region using a parameter set associated with the class, the parameter set being selected from a plurality of parameter sets for video coding at different quality levels.

BRIEF DESCRIPTION OF THE DRAWINGS

Embodiments and various aspects of this disclosure are illustrated in the following detailed description and the accompanying figures. Various features shown in the figures are not drawn to scale.

DETAILED DESCRIPTION

Figure 1:
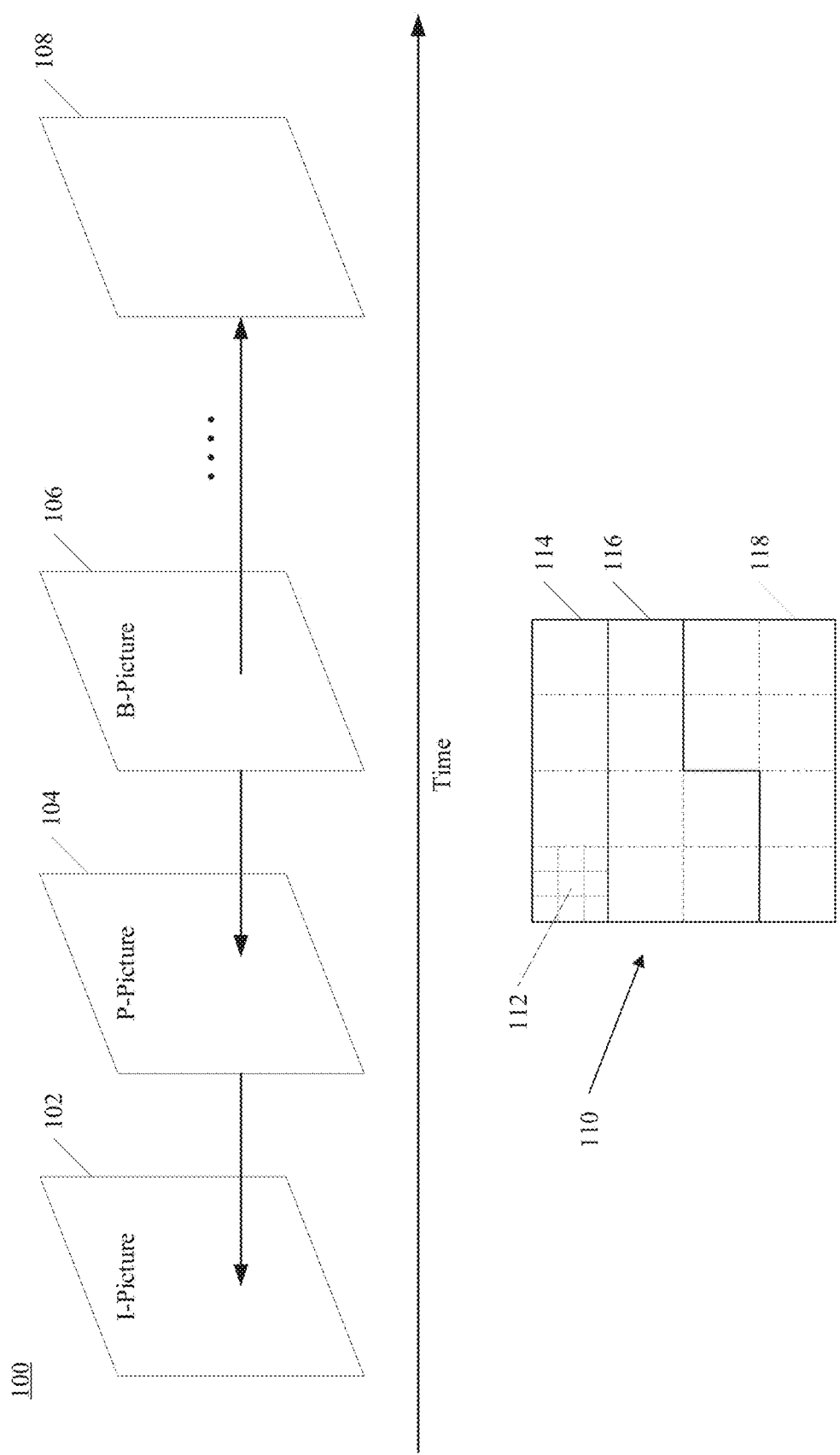
FIG. 1 illustrates structures of an example video sequence, according to some embodiments of this disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video surveillance that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most surveillance videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

This disclosure provides methods, apparatuses, and systems for characteristic-based video processing for video surveillance. A "characteristic" herein refers to a content characteristic associated with video contents in a picture, a motion characteristic associated with motion estimation of encoding or decoding the picture, or both. For example, the content characteristic can be pixels in one or more continuous pictures of a video sequence, the pixels being related to at least one of an object, a scene, or an environmental event in the picture. For another example, the motion characteristic can include information related to the video coding process, examples of which will be detailed later.

In this disclosure, when encoding a picture of a video sequence, a characteristic classifier can be used to detect and classify one or more characteristics of a picture of the video sequence. Different classes of the characteristics can be associated with bitrates for encoding. In some embodiments, different classes of the characteristics can be associated with different parameter sets for encoding, which can result in different encoding quality levels. In some embodiments, different classes of the characteristics can be associated with different priority levels that are further associated with different bitrates for encoding. Different priority levels can be associated with different parameter sets for encoding, which can result in different encoding quality levels. The higher a priority level is, the higher the quality of the video its associated parameter set can result in. By such a characteristic-based video processing, the bitrate can be greatly reduced for the surveillance video without causing significant information loss. In addition, embodiments of this disclosure can customize the corresponding relationships between the priority levels and the parameter sets for different application scenarios (e.g., security, traffic, environment monitoring, or the like), thereby greatly improving the video coding quality and greatly reducing the costs for bandwidth and storage.

FIG. 1 illustrates structures of an example video sequence 100, according to some embodiments of this disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
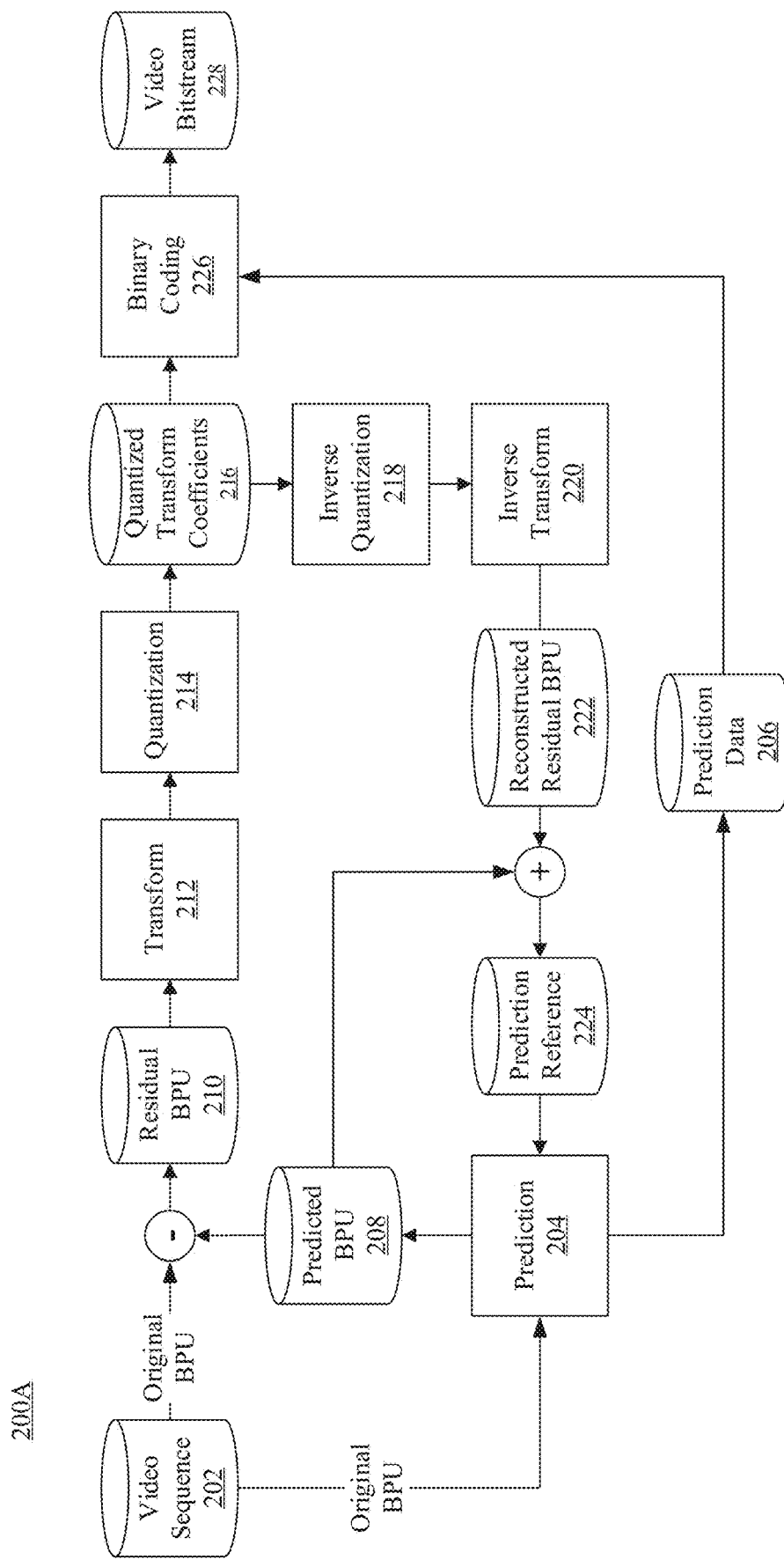
FIG. 2A illustrates a schematic diagram of an example encoding process, according to some embodiments of this disclosure.

FIG. 2A illustrates a schematic diagram of an example encoding process 200A, according to some embodiments of this disclosure. An encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
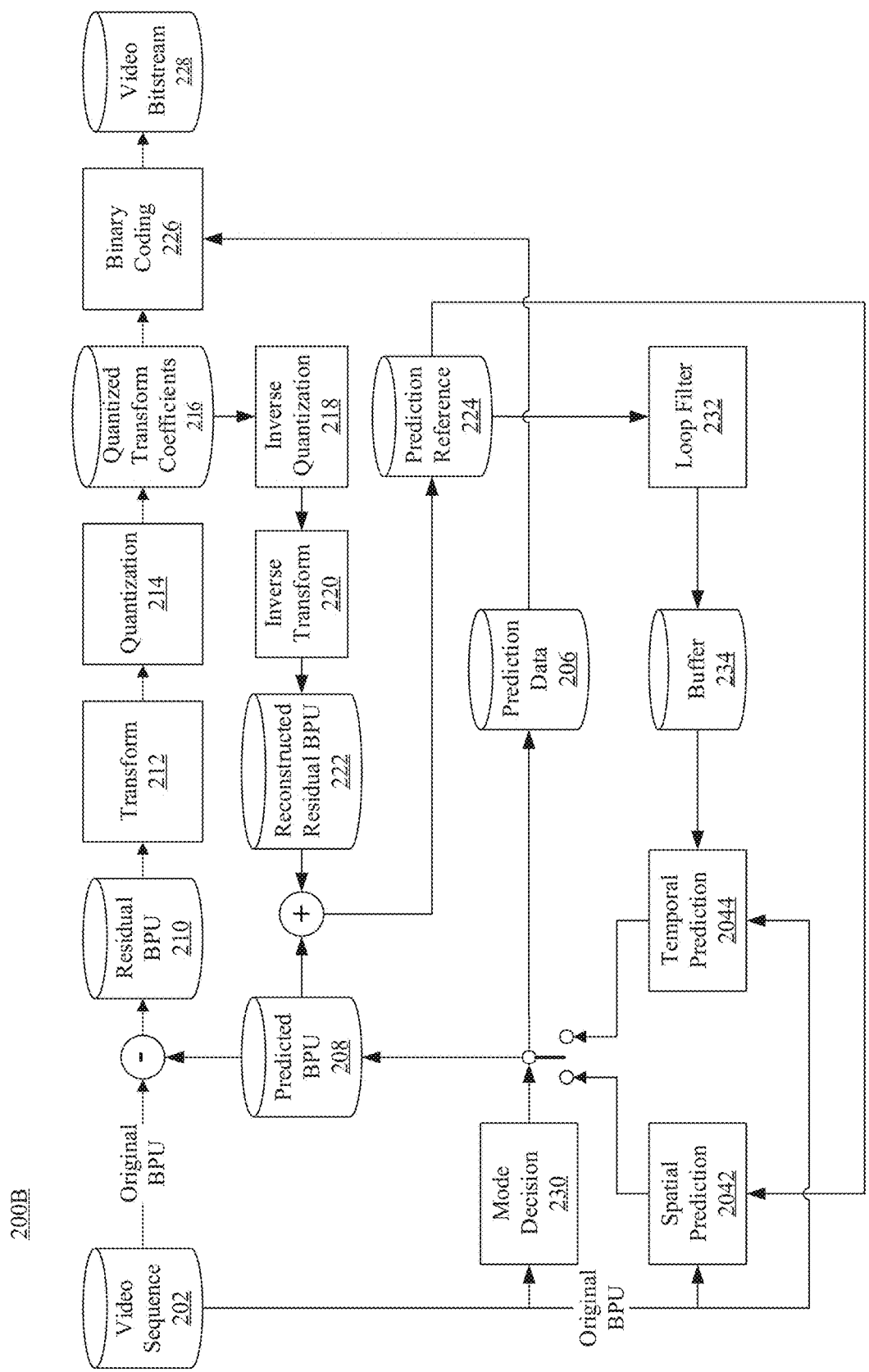
FIG. 2B illustrates a schematic diagram of another example encoding process, according to some embodiments of this disclosure.

FIG. 2B illustrates a schematic diagram of another example encoding process 200B, according to some embodiments of this disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2042, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bitrate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
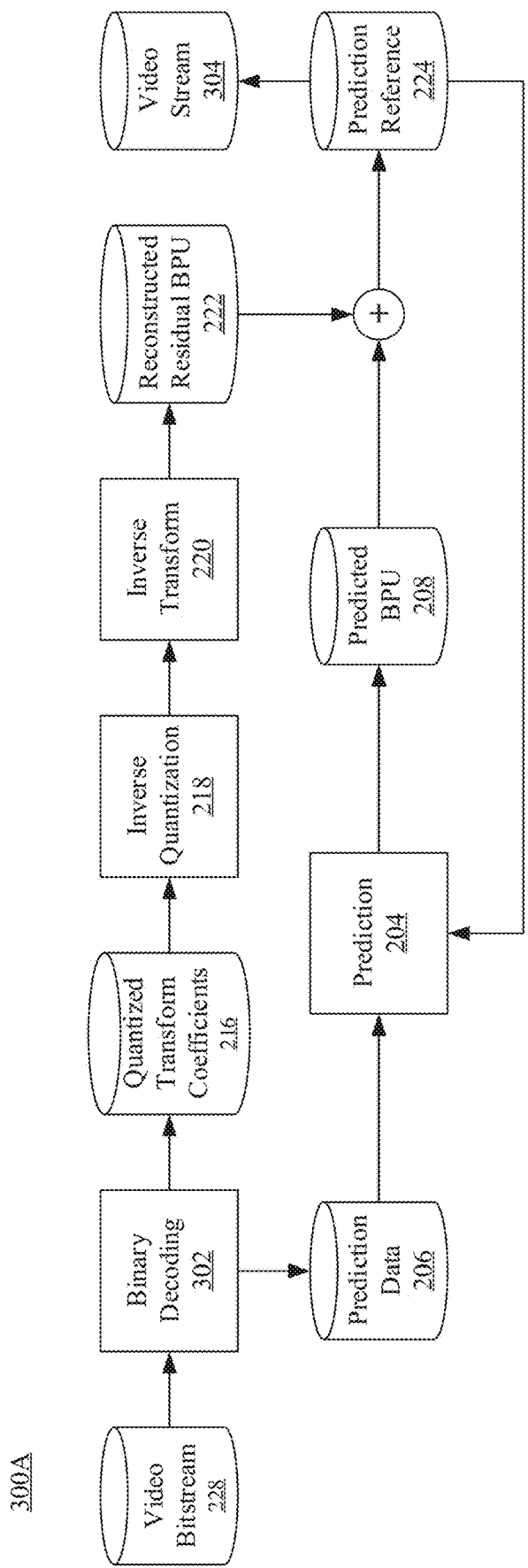
FIG. 3A illustrates a schematic diagram of an example decoding process, according to some embodiments of this disclosure.

FIG. 3A illustrates a schematic diagram of an example decoding process 300A, according to some embodiments of this disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
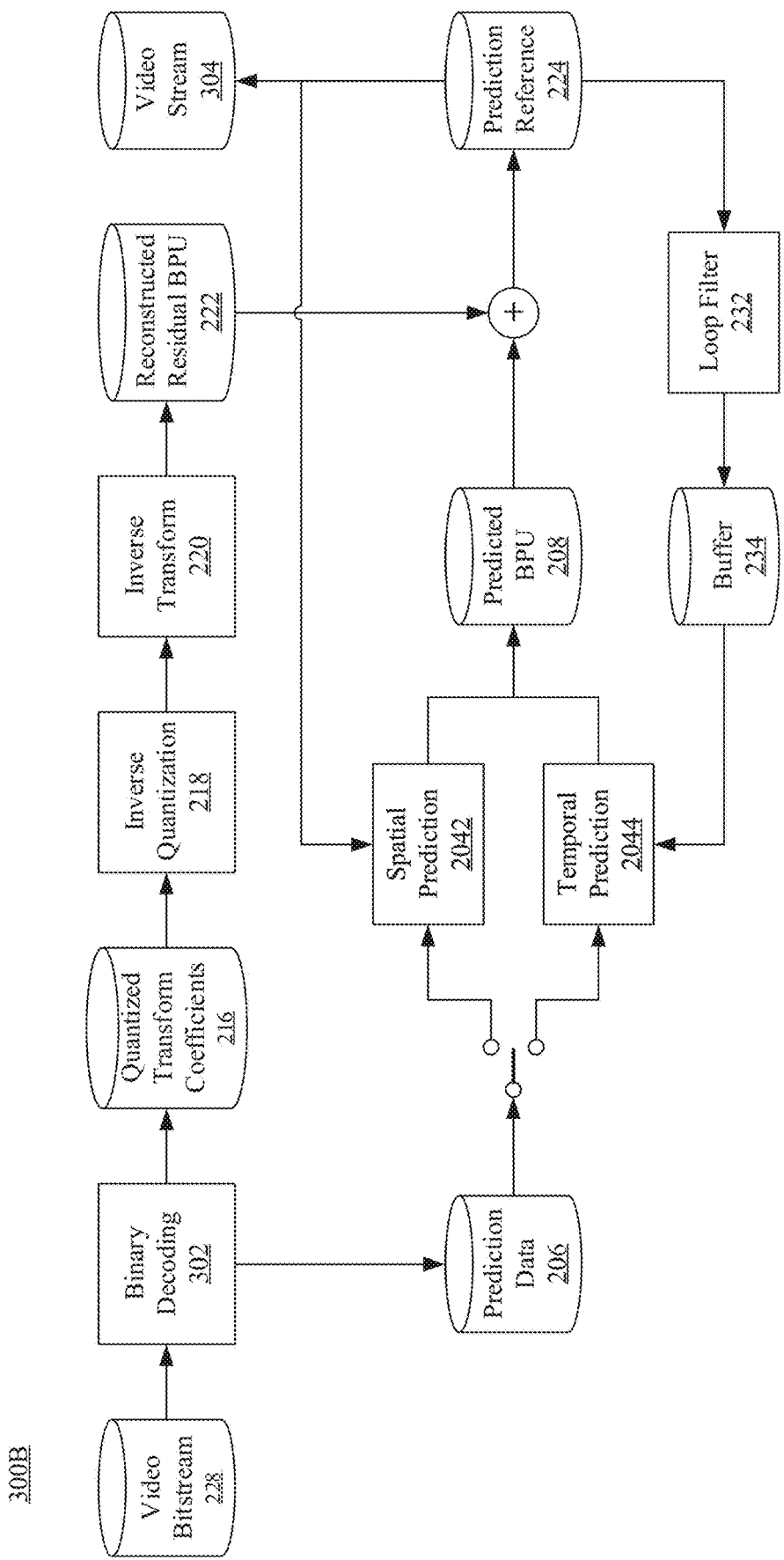
FIG. 3B illustrates a schematic diagram of another example decoding process, according to some embodiments of this disclosure.

FIG. 3B illustrates a schematic diagram of another example decoding process 300B, according to some embodiments of this disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
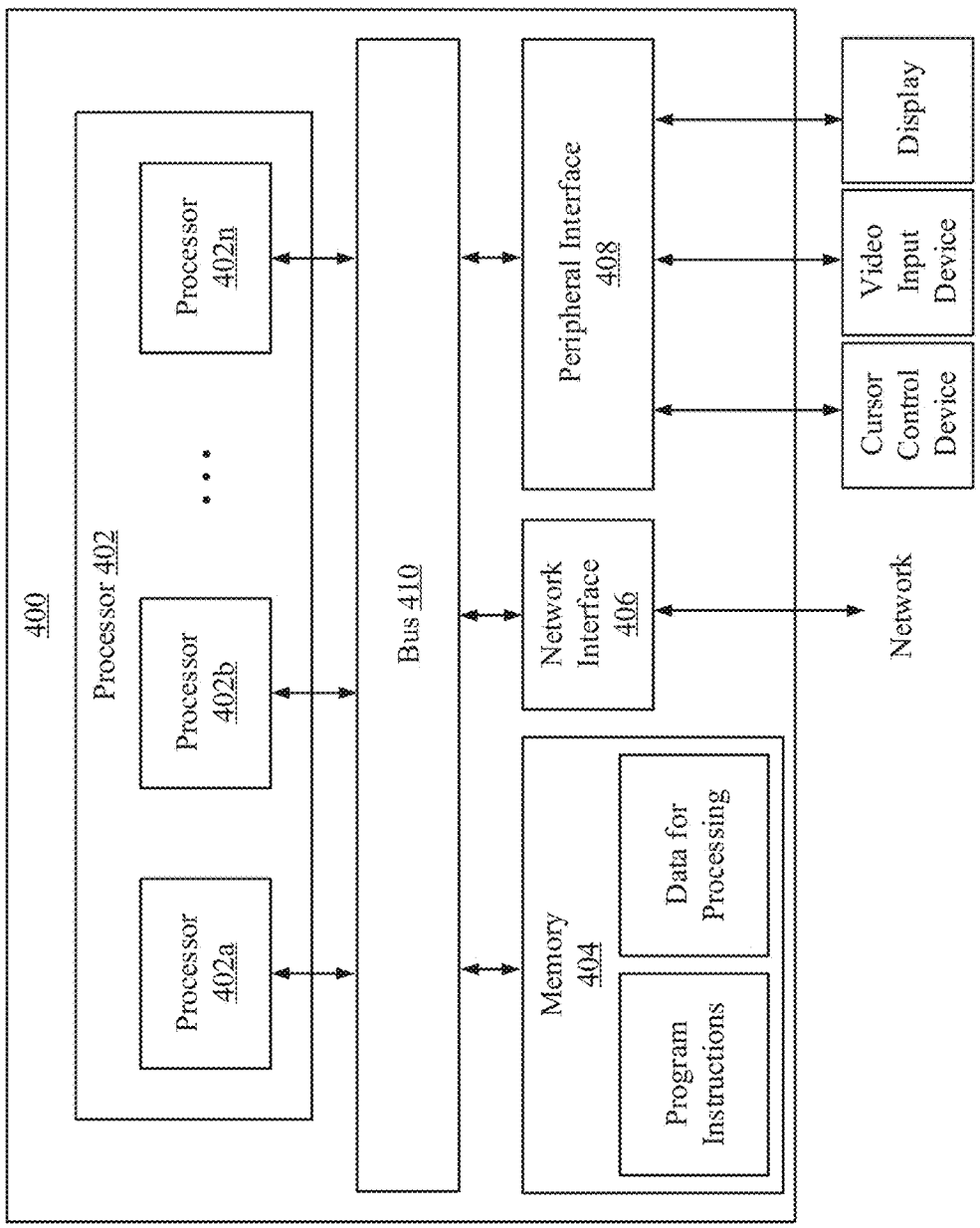
FIG. 4 illustrates a block diagram of an example apparatus for encoding or decoding a video, according to some embodiments of this disclosure.

FIG. 4 is a block diagram of an example apparatus 400 for encoding or decoding a video, according to some embodiments of this disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
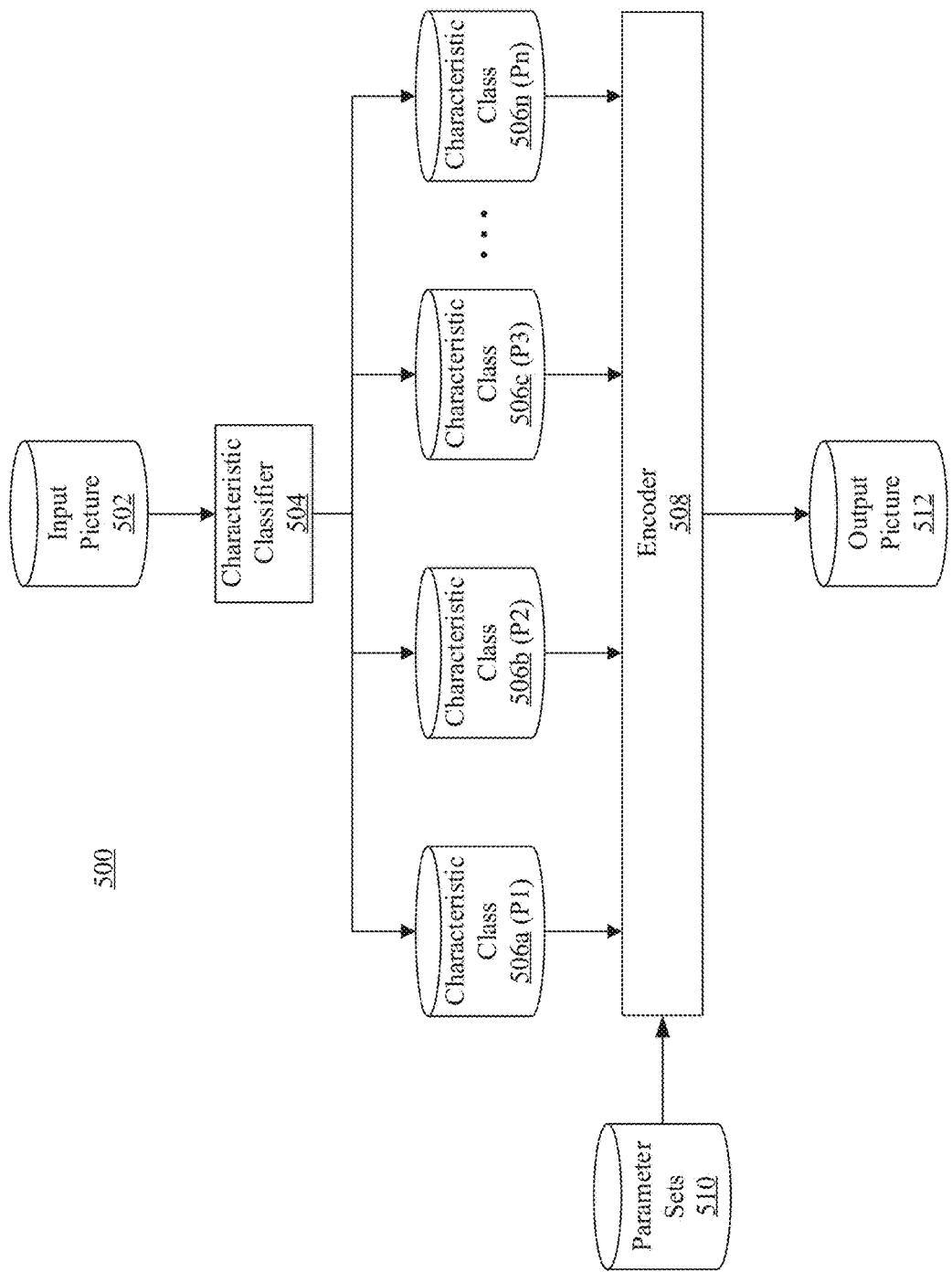
FIG. 5 illustrates a schematic diagram illustrating an example process of characteristic-based video processing, according to some embodiments of this disclosure.

FIG. 5 is a schematic diagram illustrating an example process 500 of characteristic-based video processing, according to some embodiments of this disclosure. In some embodiments, process 500 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a surveillance video sequence, which can be captured by a surveillance device (e.g., the video input device in FIG. 4) associated with a processor (e.g., processor 402) of the apparatus. The video sequence can include multiple pictures, such as input picture 502. The apparatus can perform process 500 at the level of pictures. For example, the apparatus can process one picture at a time in process 500. For another example, the apparatus can process a plurality of pictures at a time in process 500.

In FIG. 5, the apparatus can feed input picture 502 to characteristic classifier 504 that can be used to detect and classify one or more characteristics of input picture 502. In some embodiments, the characteristic of input picture 502 can include a content characteristic associated with video contents in the region, a motion characteristic associated with motion estimation of encoding or decoding the video sequence, or both. For example, the content characteristic can include pixels of interest in input picture 502. The pixels of interest can be associated with, in input picture 502, an object (e.g., an individual, an animal, a vehicle, or the like), a scene (e.g., a robbery, a gun shooting, a traffic accident, or the like), or an environmental event (e.g., air pollution, twilight, or the like). For another example, the motion characteristic can include information (e.g., a motion vector) related to the video coding process (e.g., any of processes 200A, 200B, 300A, or 300B). In some embodiments, the apparatus (e.g., apparatus 400) can load input picture 502 into its memory (e.g., memory 404) as data for processing.

In some embodiments, characteristic classifier 504 can be implemented as a software or hardware module. For example, characteristic classifier 504 can be implemented as program instructions that can be loaded into memory 404 and executed by processor 402 of apparatus 400 in FIG. 4. The executed program instructions can process data of input picture 502 to identify and classify its one or more characteristics.

In some embodiments, characteristic classifier 504 can be implemented using a machine learning technique or an artificial intelligence technique to detect the content characteristic. For example, the machine learning technique can include an image or video classification technique, an object detection or tracking technique, or the like. The image or video classification technique can be based on a neural network, such as a convolutional neural network (CNN), a recurrent neural network (RNN), or the like. The object detection or tracking technique can include, for example, a semantic segmentation technique, an instance segmentation technique, or the like.

In some embodiments, characteristic classifier 504 can be implemented as program codes to identify the motion characteristic of input picture 502 that is from video stream 304. The motion characteristic can be one or more parameters of the video coding process of input picture 502, prediction data (e.g., prediction data 206) associated with input picture 502, intermediate data (e.g., reconstructed residual BPU 222) associated with input picture 502, or the like. For example, the motion characteristic can include any combination of one or more motion vectors, a total number of motion vectors in the picture, or the like.

Still referring to process 500, after detecting characteristics of input picture 502, characteristic classifier 504 can classify the characteristics into one or more classes, including example characteristic classes 506a, 506b, 506c, and 506n. Each of the classes can represent a type of characteristics. It should be noted that characteristic classifier 504 can detect at least one of the content characteristics or the motion characteristics for input picture 502, and each of the classes (e.g., characteristic classes 506a, 506b, 506c, and 506n) can be either a class of the content characteristics or a class of the motion characteristics.

In some embodiments, when input picture 502 is from video sequence 202 or video stream 304, characteristic classifier 504 can identify its content characteristic using a machine learning technique, and determine a class for the content characteristic. For example, characteristic classifier 504 can determine the class as a content-characteristic class when it determines that input picture 502 includes at least one of an object of interest, a scene of interest, or an environmental event of interest. The object of interest, scene of interest, and environmental event of interest can be pre-defined (e.g., by user input) based on an application scenario of the video. In some embodiments, characteristic classes 506a, 506b, 506c, and 506n can represent classes of different objects, scenes, or environmental events.

For example, if the application scenario is traffic surveillance, the object of interest can include a pedestrian or a vehicle. The scene of interest can include a collision between a pedestrian and a vehicle, or between vehicles. The environmental event of interest can include, for example, at dawn or dusk where lighting condition is rapidly changing, or at dark where surveillance video quality is generally lower than normal. For another example, if the application scenario is security surveillance, the object of interest can include an individual or a weapon (e.g., a gun). The scene of interest can include a violent crime scene (e.g., a robbery, or gun firing). The environmental event of interest can include a sudden darkening of the scene (e.g., when an offender breaks interior lighting). For another example, if the application scenario is air condition surveillance, characteristic classifier 504 can prioritize classifying the environmental events of interest and de-emphasize classifying the objects of interest and the scenes of interest. The environmental events of interest can include an abnormal change of natural lighting or an abnormal change of clearness of the environment (e.g., due to haze, smog, mist, fog, or sandstorm, which indicates potential air pollution). It should be noted that this disclosure does not limit the content characteristics of interest and application scenarios to the above-described examples, and other scenario-dependent classification can be used and customized according to a user's need.

In some embodiments, when input picture 502 is decoded from a compressed video sequence (e.g., video stream 304), characteristic classifier 504 can identify the motion characteristics of input picture 502. For example, characteristic classifier 504 can determine the class as a motion-characteristic class when it determines, for input picture 502, that a magnitude of the motion vector exceeds a threshold magnitude, that the total number of motion vectors exceeds a threshold number, that an information entropy of the residual picture exceeds a threshold entropy value, or the like.

In some embodiments, when input picture 502 is from a compressed video sequence (e.g., video bitstream 228), the apparatus can decompress (e.g., decode) input picture 502 from the compressed video sequence. Characteristic classifier 504 can determine the class for input picture 502. In some embodiments, the class can be determined based on a content characteristic of input picture 502. In some embodiments, the class can be determined based on a motion characteristic of the decompression process. The apparatus can then associate the class with a parameter set.

In some embodiments, when input picture 502 is from a compressed video sequence (e.g., video bitstream 228), characteristic classifier 504 can determine the class for input picture 502 before decoding the compressed video sequence. For example, referring to FIG. 3A, the apparatus can obtain the motion characteristic (e.g., a motion vector) by obtaining prediction data 206 after binary decoding stage 302 without performing inverse quantization stage 218, inverse transform stage 220, or prediction stage 204. After obtaining the motion characteristic, the apparatus can determine the class for input picture 502 based on the motion characteristic. The apparatus can then associate the class with a parameter set.

In some embodiments, characteristic classifier 504 can determine the class associated with the parameter set for input picture 502 based on data outside of input picture 502. For example, characteristic classifier 504 can determine the class based on the characteristic of input picture 502 and a characteristic of a picture preceding to the input picture in the video sequence. By doing so, characteristic classifier 504 can detect changes of motions (e.g., acceleration or deceleration), the trajectory of motions, development of an environmental event, or the like.

Still referring to process 500, after classifying the characteristics of input picture 502, the apparatus can further associate a parameter set for each class. For example, as shown in FIG. 5, characteristic classes 506a, 506b, 506c, and 506n are associated with parameter sets P1, P2, P3, and Pn, respectively. In some embodiments, the parameter set can be assigned from a plurality of parameter sets, each of which can be associated with a bitrate for encoding. For example, the plurality of parameter sets can include a first parameter set and a second parameter set, and a first bitrate associated with the first parameter set can be higher than a second bitrate associated with the second parameter set. For another example, the plurality of parameter sets can include a first priority level and a second priority level lower than the first priority level, and a first bitrate associated with the first priority level can be higher than a second bitrate associated with the second priority level.

For example, from P1 through Pn, the associated bitrate can increase. With a higher bitrate, more information can be kept, and lower coding speed the apparatus can achieve. For reducing the overall bitrate, in process 500, the apparatus can assign parameter sets associated with high bitrates to characteristics of high interest, and assign parameter sets associated with lower bitrates to characteristics of low interest.

In some embodiments, each of the plurality of parameter sets can be associated with one or more classes. That is, one parameter set can correspond to one or more classes for characteristic classification, depending on application scenarios.

In some embodiments, the apparatus can associate the class with one of the plurality of parameter sets based on an application scenario of the surveillance device. For example, if the application scenario is traffic surveillance, characteristic classes 506a, 506b, 506c, and 506n can represent collisions between pedestrians, collisions between vehicles, collisions between pedestrians and vehicles, and collision-free background, respectively. If a user of such traffic surveillance is more interested in events involving bodily harm, the bitrates of parameter sets associated with characteristic classes 506a, 506b, 506c, and 506n can be set as P3>P2>P1>Pn, in which the ">" sign herein represents that the bitrate of the parameter set on its left is higher than the bitrate of the parameter set on its right. For content characteristics of input picture 502, based on the classes of the content characteristics, the apparatus can determine different bitrates for encoding regions that include those characteristics. Among characteristic classes 506a, 506b, 506c, and 506n, regions having a characteristic of characteristic class 506c can be encoded with the highest bitrate, and regions having a characteristic of characteristic class 506n can be encoded with the lowest bitrate.

For another example, if the application scenario is wildlife conservation, characteristic classes 506a, 506b, 506c, and 506n can represent the appearance of a first species of animal, appearance of a second species of animal, appearance of a third species of animal, and no appearance of any species of animal of interest, respectively. The first, second, and third species of animals can have increasing endangered levels, respectively. If a user of such surveillance is more interested in high endanger-level species, the bitrates of parameter sets associated with characteristic classes 506a, 506b, 506c, and 506n can be set as P3>P2>P1>Pn. The apparatus can then encode regions having such characteristics according to the bitrates associated with the characteristics in a similar way as described above.

For yet another example, if the application scenario is weather surveillance, characteristic classes 506a, 506b, 506c, and 506n can represent a low number of motion vectors per picture with low magnitude, an intermediate number of motion vectors per picture with intermediate magnitudes, a high number of motion vectors per picture with high magnitudes, and no motion vector, respectively. Characteristic classes 506a, 506b, 506c, and 506n can indicate a light snowfall, a moderate snowfall, a snowstorm, and no snow, respectively. If a user of such surveillance is more interested in identifying inclement weather, the bitrates of parameter sets associated with characteristic classes 506a, 506b, 506c, and 506n can be set as Pn>P1>P2>P3. The apparatus can then encode regions having such characteristics according to the bitrates associated with the characteristics in a similar way as described above.

Still referring to process 500, after characteristic classifier 504 identifies a characteristic of input picture 502, determines the classes, and assign parameter sets for the classes, the apparatus can feed input picture 502 to encoder 508 for encoding a region (e.g., a group of BPUs) of input picture 502, which includes the characteristic, using a parameter set (e.g., including a bitrate) associated with the class. For example, the parameter set can be retrieved from parameter sets 510 in FIG. 5. After all regions of input picture 502 have been encoded, encoder 508 can include output picture 512 into a video bitstream.

For example, the parameter sets 510 can include multiple parameter sets for encoding a video, each of which can be associated with one or more classes. When characteristic classifier 504 determines characteristic classes (e.g., characteristic classes 506a through 506n), the apparatus can retrieve parameter sets associated with the classes (e.g., P1 through Pn) to be used by encoder 508.

In some embodiments, besides the bitrates, each of the parameter sets 510 can further include at least one of a quantization parameter, a frame rate, a resolution, a picture type (e.g., I-, P-, or B-picture), a number of consecutive pictures to share the same encoding parameters (e.g., a group-of-picture or "GOP"), or any other parameter for video coding. Different parameter sets can cause encoder 508 to encode regions of input picture 502 at different quality levels. For example, a parameter set associated with a high bitrate can cause encoder 508 to encode a region of input picture 502 at a higher quality than a parameter set associated with a low bitrate. For example, each of parameter sets 510 can include a different setting of the quantization parameter. A parameter set associated with a high bitrate can have a small quantization parameter, in which case the information loss in the quantization operation (e.g., quantization stage 214 in FIGS. 2A-2B) can be small, but the bitrate of output picture 512 can be high. A parameter set associated with a low bitrate can have a large quantization parameter, in which case the information loss in the quantization operation can be large, but the bitrate of output picture 512 can be low.

In some embodiments, encoder 508 can additionally encode the used parameter set to associate it with output picture 512 in the coded video bitstream. For example, encoder 508 can store the encoded parameter set at a picture level in the coded video bitstream, such as a picture parameter set (PPS) in an H.26x coding standard. For example, the parameter set can include a quantization parameter, and if encoder 508 stores the encoded parameter set at the picture level, each picture can use an independent quantization parameter for the quantization operation. For another example, encoder 508 can store the encoded parameter set at a sequence level in the coded video bitstream, such as a sequence parameter set (SPS) in an H.26x coding standard. For another example, the apparatus can store the encoded parameter set as parallel data of the coded video bitstream (e.g., stored as associated data outside the coded video bitstream). It should be noted that the parameter set can be associated with the coded video bitstream in various embodiments and is not limited to the above-described examples. The encoded parameter set can be used by a decoder to decode the video bitstream correctly.

In some embodiments, the apparatus can store the coded video stream and the classes associated with pictures (e.g., output picture 512) of the coded video stream in a database (not shown in FIG. 5). In some embodiments, the classes can be searchable in the database, and portions of the coded video stream can be located by a class. For example, in a relational database, the classes (e.g., a text of "car collision," "robbery," "wild panda," "snowstorm," "urban smog," or the like) can be used as an inquiry key to search for relevant portions of videos. By inquiring the database with the class, a user can retrieve pictures of the coded video stream associated with the class without viewing the video from the start.

Figure 6:
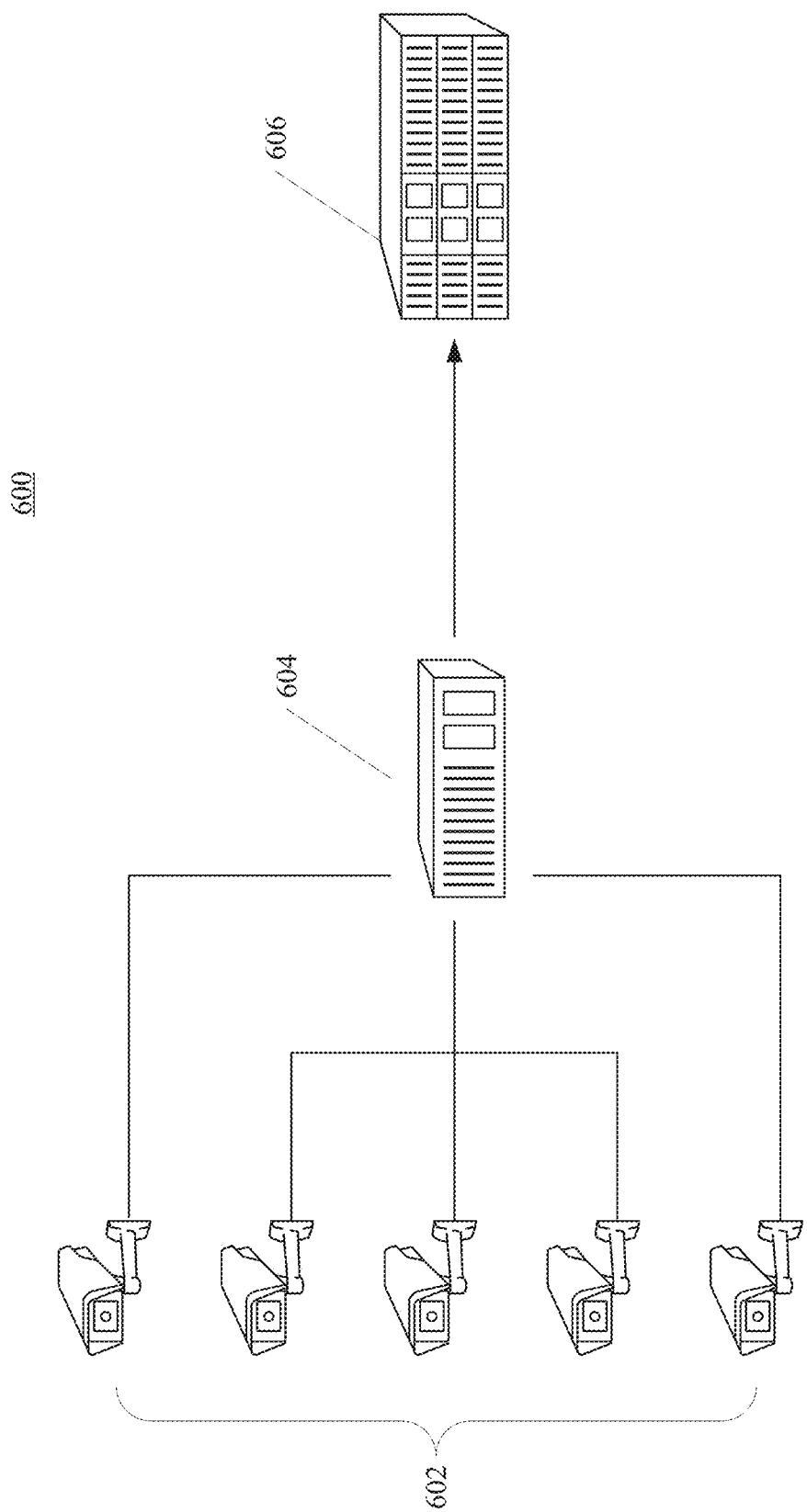
FIG. 6 illustrates a schematic diagram illustrating an example video encoding and decoding system, according to some embodiments of this disclosure.

FIG. 6 is a schematic diagram illustrating an example video encoding and decoding system 600, according to some embodiments of this disclosure. System 600 can be a video surveillance system. System 600 includes multiple video capture devices 602 (e.g., surveillance cameras), a server 604 communicatively coupled to video capture devices 602, and a database 606 communicatively coupled to server 604. In some embodiments, video capture devices 602, server 604, and database 606 can be coupled via a network (e.g., Internet). In some embodiments, video capture devices 602 can be coupled to server 604 (e.g., a monitoring computer directly connected to video capture devices 602) via a wired or wireless connection. In some embodiments, server 604 can be coupled to database 606 via a physical connection (e.g., a cable). In some embodiments, none of video capture devices 602, server 604, and database 606 share physical connections. For example, server 604 can include one or more cloud servers that can provide a cloud service, to which video capture devices 602 and database 606 can connect over the network. It should be noted that the numbers of video capture devices 602, server 604, and database 606 in system 600 are only examples, and each of them can be of any number and any configuration, which is not limited by this disclosure.

In some embodiments, video capture devices 602 can be cameras capable of transmitting captured videos to server 604. In some embodiments, one or more of video capture devices 602 can be cameras communicatively coupled to respective apparatuses (e.g., apparatus 400), which in turn are capable of transmitting captured videos to server 604.

In some embodiments, process 500 can be performed by video capture devices 602. For example, video capture devices 602 can apply process 500 on the captured videos, in which input picture 502 can be from an uncompressed video sequence. In some embodiments, process 500 can be performed by server 604. For example, for reducing the size of videos to be transmitted to server 604, video capture devices 602 can compress (e.g., by encoding according to process 200A or 200B in FIGS. 2A-2B) the captured videos before such transmission. When server 604 receives the compressed videos, it can transcode them by applying process 500, in which input picture 502 can be from a decoded compressed video bitstream.

In some embodiments, server 604 can transmit the output videos of process 500 to database 606 for storage. The outputted videos stored in database 606 can be indexable. For example, an outputted video can have one or more classes associated with one or more of its pictures. The classes can be searchable in the database, by which a portion of the outputted video can be located by inquiring database 606 with a class as described in FIG. 5.

As shown in FIGS. 5-6, process 500 can provide several advantages compared with existing solutions to reduce the overall bitrate of surveillance videos. Compared with other videos, surveillance videos have several unique features. For example, the background of the surveillance video is generally nearly static or have few changes, by which characteristic classifier 504 can provide high detection accuracy. Also, users of surveillance videos are usually only interested in certain information that has certain characteristics, depending on application scenarios as described above. By applying characteristic classifier 504 to identify and classify different classes of characteristics for surveillance videos, different parameter sets can be assigned to video information of different levels of interest. Based on such parameter sets, high-priority video information can be encoded or transcoded at high quality (e.g., at a high bitrate), and low-priority video information (e.g., the background of surveillance, or pictures having no information of interest) can be encoded or transcoded at low quality (e.g., at a low bitrate). As a result, an apparatus performing process 500 can encode or transcode a video at a much lower overall bitrate without sacrificing video information being of interest to the users, thereby improving the usefulness of the surveillance video and saving computational cost, transmission bandwidth, and storage space of the surveillance video.

Further, because the parameter sets can be assigned depending on different application scenarios, process 500 can be adaptive to a wide range of applications without heavy modifications. Moreover, if the different classes of characteristics of the surveillance video are also stored (e.g., stored in database 606) with the output video encoded or transcoded according to process 500, a characteristic-based video processing system (e.g., system 600) can provide the capability of searching portions of videos by the classes.

Figure 7:
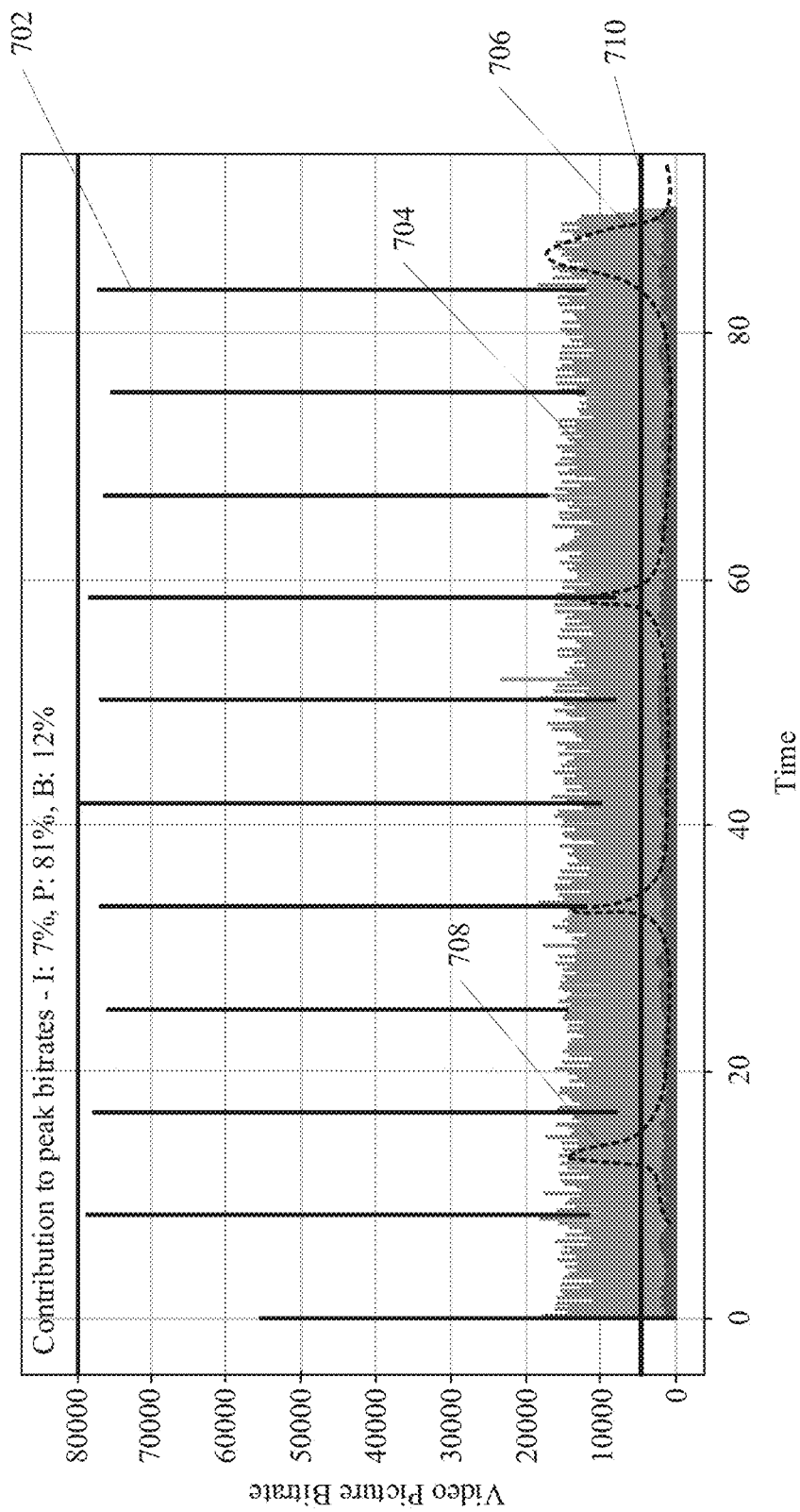
FIG. 7 illustrates a schematic diagram of improvement by characteristic-based video processing to overall bitrates of a video, according to some embodiments of this disclosure.

FIG. 7 illustrates a schematic diagram of improvement by characteristic-based video processing to overall bitrates of a video, according to some embodiments of this disclosure. FIG. 7 shows fluctuations of video picture bitrate over time, in which the vertical axis shows the video picture bitrate, and the horizontal axis shows time. Conventional solutions to reduce overall bitrates of a video include reducing the usage of I-pictures in video coding for a coding process that uses I-, P-, and B-pictures. However, the limitations of such a conventional solution can be shown in FIG. 7 by I-picture peak bitrate 702 (shown as vertical spikes), P-picture peak bitrate 704 (shown as grey peaks), and B-picture peak bitrate 706 (shown as dark peaks). Of all the contributions to the overall peak rates of a video, I-picture peak bitrate 702 can contribute 7%, P-picture peak bitrate 704 can contribute 81%, and B-picture peak bitrate 706 can contribute 12%. The conventional solution of reducing using I-pictures in video coding cannot improve much to reduce the overall peak rate, because the contribution to the overall bitrate from I-pictures is already small.

In contrast, if the same video is encoded or transcoded using the characteristic-based video processing method (e.g., by applying process 500 in FIG. 5), the overall bitrate can be greatly reduced, as shown by peak bitrate curve 708 and average bitrate 710 in FIG. 7. Compared with I-picture peak bitrate 702, P-picture peak bitrate 704, and B-picture peak bitrate 706, peak bitrate curve 708 does not depend on picture types but are much lower overall, because the characteristic-based video processing can be applied to all picture types. The benefits of the characteristic-based video processing can also be shown by a very low average bitrate 710. As shown in FIG. 7, peak bitrate curve 708 includes multiple peaks (four, as shown in FIG. 7) corresponding to detected characteristics (e.g., content characteristics, motion characteristics, or the like) of interest. Video pictures having the characteristics of interest can be coded with a high bitrate, represented by the peaks of peak bitrate curve 708, and video pictures having no characteristics of interest can be coded with a low bitrate, by which the overall bitrate can be greatly reduced without sacrificing quality of video information interested to users of surveillance videos.

Figure 8:
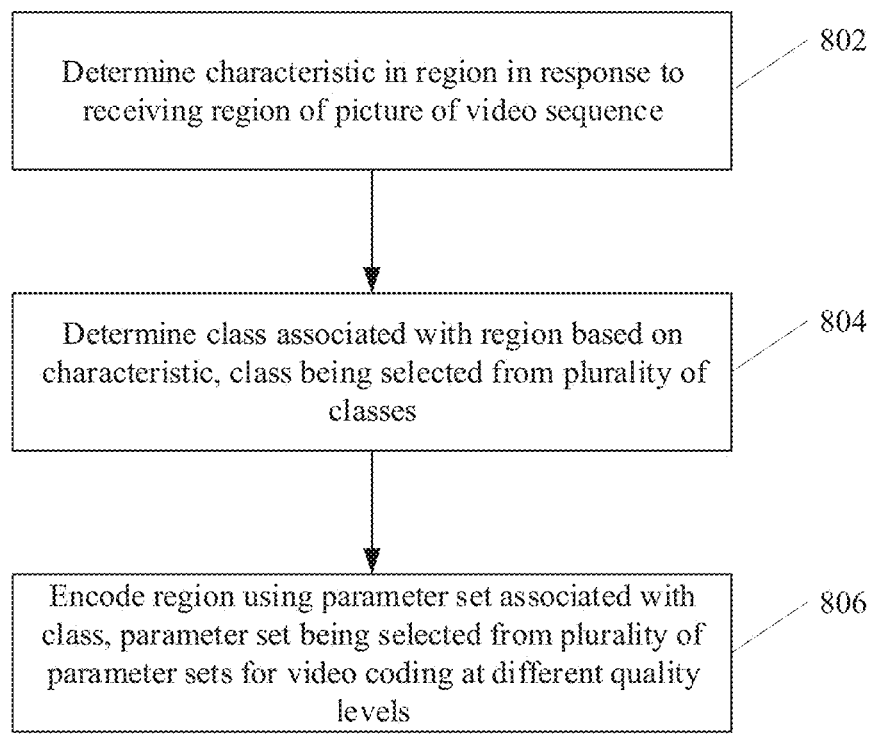
FIG. 8 illustrates a flowchart of an example process for characteristic-based video processing, according to some embodiments of this disclosure.

FIG. 8 illustrates a flowchart of an example process 800 for characteristic-based video processing, according to some embodiments of this disclosure. In some embodiments, process 800 can be performed by an encoder. For example, the encoder can be implemented as one or more software or hardware components of an apparatus (e.g., apparatus 400) for encoding or transcoding a video sequence. For example, a processor (e.g., processor 402 in FIG. 4) can perform process 800. In some embodiments, processor 402 can perform process 800 on a surveillance video sequence. In some embodiments, the video sequence can be captured by a surveillance device (e.g., the video input device in FIG. 4) associated with processor 402.

In some embodiments, the surveillance video sequence can be uncompressed (e.g., video sequence 202 in FIGS. 2A-2B), and processor 402 can process the uncompressed video sequence according to process 800 before encoding it (e.g., according to process 200A or 200B in FIGS. 2A-2B). In some embodiments, the surveillance video sequence can be compressed (e.g., video bitstream 228 in FIGS. 2A-2B), and processor 402 can decode the compressed video bitstream (e.g., according to process 300A or 300B in FIGS. 3A-3B), process the decoded video sequence (e.g., video stream 304 in FIGS. 3A-3B) according to process 800, and re-encode it (e.g., according to process 200A or 200B in FIGS. 2A-2B). For example, as shown in FIG. 6, any of video capture devices 602 can capture a video sequence (e.g., video sequence 202 in FIGS. 2A-2B), compress it to a video bitstream (e.g., video bitstream 228 in FIGS. 2A-2B) to reduce needed bandwidth for network transmission, and transmit it to a remote computer (e.g., server 604). Server 604 can then decode the compressed video bitstream, perform process the decoded video sequence according to process 800, and re-encode it.

Referring to process 800, at step 802, in response to receiving a region of a picture (e.g., any of pictures 104-108 in FIG. 1) of a video sequence (e.g., video sequence 100 in FIG. 1 or video sequence 202 in FIGS. 2A-2B), processor 402 determines a characteristic in the region. In some embodiments, the region can be independent of other regions of the picture for video coding. For example, the region can be any of region 114, 116, or 118 in FIG. 1. In some embodiments, such as in some coding standards, the region can be a slice of the picture, a tile of the picture, or the picture itself.

In some embodiments, the characteristic in the region can include a content characteristic associated with video content in the region. For example, the content characteristic can include any combination of an object in the region, a scene in the region, an environmental event in the region, or the like. In some embodiments, the characteristic in the region can include a motion characteristic associated with motion estimation of encoding or decoding the video sequence. For example, the motion characteristic can include any combination of a magnitude of a motion vector in the region, a total number of motion vectors in the region, or the like.

In some embodiments, when the characteristic in the region includes a content characteristic, processor 402 can determine the content characteristic using a machine learning technique (e.g., an artificial intelligence technique). For example, the machine learning technique can include any combination of an object detection technique, a semantic segmentation technique, an instance segmentation technique, or the like.

In some embodiments, when the characteristic in the region includes a motion characteristic, processor 402 can determine that the motion characteristic exists in the region based on any combination of the following conditions: the magnitude of the motion vector exceeds a threshold magnitude; the total number of motion vectors exceeds a threshold number; or the like.

In some embodiments, the video sequence can be a compressed video sequence, in which processor 402 can decode the region before determining the characteristic in the region in response to receiving data of the region of the picture. In such embodiments, if the characteristic comprises a motion characteristic, processor 402 can determine the motion characteristic in the region. For example, processor 402 can determine motion data (e.g., prediction data 206 or quantized transform coefficients 216 in FIGS. 2A-3B) from decoding the region. For example, the motion data can include a motion vector in the region. For another example, the motion data can include a total number of motion vectors in the region. Processor 402 can then determine the motion characteristic from the motion data. In some embodiments, processor 402 can obtain the motion data by decoding the region without decompressing it. For example, processor 402 can perform binary decoding stage 302 in FIGS. 3A-3B and obtain prediction data 206 that includes the motion data without performing any of inverse quantization stage 218, inverse transform stage 220, or prediction stage 204 (or, as shown in FIG. 3B, spatial prediction stage 2042 or temporal prediction stage 2044).

Still referring to process 800, at step 804, processor 402 determines a class associated with the region based on the characteristic. The class can be selected from multiple classes. In some embodiments, each of the multiple classes can be associated with a priority level. In some embodiments, multiple priority levels can be associated with multiple classes according to an application of the video sequence.

In some embodiments, when the characteristic in the region includes a content characteristic, processor 402 can determine different interest levels for different classes of content characteristics based on an application scenario of the video sequence. Based on the interest levels, processor 402 can then associate the multiple priority levels with the classes of the content characteristics. The interest levels of the classes can be customized for different application scenarios. For example, the interest level of a class representing vehicles can be determined as higher in an application scenario of traffic surveillance than in an application scenario of wildlife surveillance.

In some embodiments, when the characteristic in the region includes a motion characteristic, processor 402 can determine ranges for classes of motion characteristics based on an application scenario of the video sequence. Based on the ranges, processor 402 can associate the multiple priority levels with the classes of the motion characteristics. The ranges of the classes can be customized for different application scenarios. For example, if the motion characteristic is the magnitude of the motion vector, the magnitude can be divided into ranges for identifying classes. In an application of weather surveillance, a range of small magnitudes can indicate a class of light snowfalls, a range of intermediate magnitudes can indicate a class of moderate snowfalls, and a range of large magnitudes can indicate a class of snowstorms. In an application of air pollution surveillance, the ranges of the magnitudes of the motion vectors can be divided differently from the weather surveillance application scenario.

Still referring to process 800, at step 806, processor 402 encodes the region using a parameter set associated with the class. The parameter set can be selected from multiple parameter sets, each of which can be used for video coding at a different quality level. For example, the parameter set can include any combination of any number of a bitrate for video coding, a quantization parameter, a frame rate, a resolution, a picture type (e.g., I-, P-, or B-picture), or the like. In some embodiments, the parameter sets can be associated with multiple classes (e.g., the classes of the content characteristics or the classes of the motion characteristics) according to an application of the video sequence based on the interest levels of the classes that are described in step 804.

In some embodiments, the values of the priority levels can be proportional to the quality levels of respective associated parameter sets. For example, the multiple priority levels can include a first priority level and a second priority level lower than the first priority level. The multiple parameter sets can include a first parameter set associated with the first priority level and a second parameter set associated with a second priority level. The first parameter set can be used for video encoding at a first quality level, and the second parameter set can be used for video encoding at a second quality level lower than the first quality level. In some embodiments, the values of the priority levels can be inversely proportional to the quality levels of respective associated parameter sets. In some other embodiments, the values of the priority levels can be related to the quality levels of respective associated parameter sets by a hash table. It should be noted that the relationships between the priority levels and the quality levels of respective associated parameter sets can be in other forms and not limited to the above examples.

In some embodiments, after step 806, processor 402 can further generate a coded video stream (e.g., video bitstream 228 in FIGS. 2A-2B). The video stream can include the parameter set and the encoded region. For example, in some coding standards (e.g., H.264/AVC, H.265/HEVC, H.266/VVC, or the like), the parameter set associated with the region can be encoded in a picture parameter set (PPS) of the picture that includes the region. In such embodiments, the parameter set can be stored and used individually for each picture of the video stream. For example, the parameter set can include a quantization parameter, and each picture of the video stream can be quantized using an independent quantization parameter.

In some embodiments, after generating the coded video stream, processor 402 can store the coded video stream and classes associated with at least one picture of the video sequence in a database (e.g., database 606). In some embodiments, the classes are searchable in the database, by which a portion of the coded video stream corresponding to any class can be locatable. by a class In some embodiments, a non-transitory computer-readable storage medium including instructions is also provided, and the instructions can be executed by a device (such as the disclosed encoder and decoder) for performing the above-described methods. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

It is appreciated that the above-described embodiments can be implemented by hardware, or software (program codes), or a combination of hardware and software. If implemented by software, it can be stored in the above-described computer-readable media. The software, when executed by the processor, can perform the disclosed methods. The computing units and other functional units described in the present disclosure can be implemented by hardware, or software, or a combination of hardware and software. One of ordinary skill in the art will also understand that multiple ones of the above-described modules/units can be combined as one module/unit, and each of the above-described modules/units can be further divided into a plurality of sub-modules/sub-units.

The embodiments may further be described using the following clauses:

1. A non-transitory computer-readable storage medium storing a set of instructions that are executable by one or more processors of a device to cause the device to perform a method comprising:
in response to receiving a region of a picture of a video sequence, determining a characteristic in the region, the region being independent of other regions of the picture for video coding;
determining a class associated with the region based on the characteristic, the class being selected from a plurality of classes; and
encoding the region using a parameter set associated with the class, the parameter set being selected from a plurality of parameter sets for video coding at different quality levels.
2. The non-transitory computer-readable storage medium of clause 1, wherein the region is one of a slice of the picture, a tile of the picture, or the picture.
3. The non-transitory computer-readable storage medium of any of clauses 1-2, wherein the characteristic comprises a content characteristic associated with video contents in the region, and wherein the content characteristic comprises at least one of an object in the region, a scene in the region, or an environmental event in the region.
4. The non-transitory computer-readable storage medium of clause 3, wherein determining the characteristic in the region comprises:
determining the content characteristic using a machine learning technique, wherein the machine learning technique comprises at least one of an object detection technique, a semantic segmentation technique, or an instance segmentation technique.
5. The non-transitory computer-readable storage medium of clause 3, wherein the set of instructions that are executable by the one or more processors cause the device to further perform:
determining interest levels for classes of content characteristics based on an application scenario of the video sequence; and
associating the plurality of parameter sets with the classes of content characteristics based on the interest levels.
6. The non-transitory computer-readable storage medium of any of clauses 1-5, wherein the characteristic comprises a motion characteristic associated with motion estimation of encoding or decoding the video sequence, and wherein the motion characteristic comprises at least one of a magnitude of a motion vector in the region or a total number of motion vectors in the region.
7. The non-transitory computer-readable storage medium of clause 6, wherein determining the characteristic in the region comprises:
determining that the motion characteristic exists in the region based on at least one of a determination that the magnitude of the motion vector exceeds a threshold magnitude or a determination that the total number of motion vectors exceeds a threshold number.
8. The non-transitory computer-readable storage medium of clause 6, wherein the set of instructions that are executable by the one or more processors cause the device to further perform:
determining ranges for classes of motion characteristics based on an application scenario of the video sequence; and
associating the plurality of parameter sets with the classes of motion characteristics based on the ranges.
9. The non-transitory computer-readable storage medium of any of clauses 1-8, wherein the video sequence is a compressed video sequence, and the set of instructions that are executable by the one or more processors cause the device to further perform:
in response to receiving data of the region of the picture, decoding the region before determining the characteristic in the region.
10. The non-transitory computer-readable storage medium of clause 9, wherein the characteristic comprises a motion characteristic associated with motion estimation of encoding or decoding the video sequence, and wherein determining the characteristic in the region comprises:
determining motion data from decoding the region, wherein the motion data comprises a motion vector in the region; and
determining the motion characteristic from the motion data.

11. The non-transitory computer-readable storage medium of any of clauses 1-10, wherein the class is associated with a priority level selected from a plurality of priority levels,
the plurality of priority levels comprises a first priority level and a second priority level lower than the first priority level,
the plurality of parameter sets comprises a first parameter set associated with the first priority level and a second parameter set associated with a second priority level, and
the first parameter set is for video encoding at a first quality level, and the second parameter set is for video encoding at a second quality level lower than the first quality level.

12. The non-transitory computer-readable storage medium of any of clauses 1-11, wherein each of the plurality of parameter sets corresponds to one or more classes.

13. The non-transitory computer-readable storage medium of any of clauses 1-12, wherein the parameter set comprises at least one of a bitrate for video coding, a quantization parameter, a frame rate, a resolution, or a picture type.

14. The non-transitory computer-readable storage medium of any of clauses 1-13, wherein the set of instructions that are executable by the one or more processors cause the device to further perform:
generating a coded video stream comprising the parameter set and the region encoded.

15. The non-transitory computer-readable storage medium of clause 14, wherein the set of instructions that are executable by the one or more processors cause the device to further perform:
storing the coded video stream and classes associated with at least one picture of the video sequence in a database, wherein the classes are searchable, and a portion of the coded video stream corresponding to any class is locatable by a class.

16. The non-transitory computer-readable storage medium of any of clauses 1-15, wherein the video sequence is captured by a surveillance device associated with the processor.

17. An apparatus, comprising:
a memory configured to store instructions; and
a processor coupled to the memory and configured to execute the instructions to cause the apparatus to:
in response to receiving a region of a picture of a video sequence, determine a characteristic in the region, the region being independent of other regions of the picture for video coding;
determine a class associated with the region based on the characteristic, the class being selected from a plurality of classes; and
encode the region using a parameter set associated with the class, the parameter set being selected from a plurality of parameter sets for video coding at different quality levels.

18. The apparatus of clause 17, wherein the region is one of a slice of the picture, a tile of the picture, or the picture.

19. The apparatus of any of clauses 17-18, wherein the characteristic comprises a content characteristic associated with video contents in the region, and wherein the content characteristic comprises at least one of an object in the region, a scene in the region, or an environmental event in the region.

20. The apparatus of clause 19, wherein the processor configured to execute the instructions to cause the apparatus to determine the characteristic in the region is further configured to execute the instructions to cause the apparatus to:
determine the content characteristic using a machine learning technique, wherein the machine learning technique comprises at least one of an object detection technique, a semantic segmentation technique, or an instance segmentation technique.

21. The apparatus of clause 19, wherein the processor is further configured to execute the instructions to cause the apparatus to:
determine interest levels for classes of content characteristics based on an application scenario of the video sequence; and
associate the plurality of parameter sets with the classes of content characteristics based on the interest levels.

22. The apparatus of any of clauses 17-21, wherein the characteristic comprises a motion characteristic associated with motion estimation of encoding or decoding the video sequence, and wherein the motion characteristic comprises at least one of a magnitude of a motion vector in the region or a total number of motion vectors in the region.

23. The apparatus of clause 22, wherein the processor configured to execute the instructions to cause the apparatus to determine the characteristic in the region is further configured to execute the instructions to cause the apparatus to:
determine that the motion characteristic exists in the region based on at least one of a determination that the magnitude of the motion vector exceeds a threshold magnitude or a determination that the total number of motion vectors exceeds a threshold number.

24. The apparatus of clause 22, wherein the processor is further configured to execute the instructions to cause the apparatus to:
determine ranges for classes of motion characteristics based on an application scenario of the video sequence; and
associate the plurality of parameter sets with the classes of motion characteristics based on the ranges.

25. The apparatus of any of clauses 17-24, wherein the video sequence is a compressed video sequence, and the processor is further configured to execute the instructions to cause the apparatus to:
in response to receiving data of the region of the picture, decode the region before determining the characteristic in the region.

26. The apparatus of clause 25, wherein the characteristic comprises a motion characteristic associated with motion estimation of encoding or decoding the video sequence, and wherein the processor configured to execute the instructions to cause the apparatus to determine the characteristic in the region is further configured to execute the instructions to cause the apparatus to:
determine motion data from decoding the region, wherein the motion data comprises a motion vector in the region; and
determine the motion characteristic from the motion data.

27. The apparatus of any of clauses 17-26, wherein the class is associated with a priority level selected from a plurality level of priority levels, the plurality of priority levels comprises a first priority level and a second priority level lower than the first priority level, the plurality of parameter sets comprises a first parameter set associated with the first priority level and a second parameter set associated with a second priority level, and the first parameter set is for video encoding at a first quality level, and the second parameter set is for video encoding at a second quality level lower than the first quality level.

28. The apparatus of any of clauses 17-27, wherein each of the plurality of parameter sets corresponds to one or more classes.

29. The apparatus of any of clauses 17-28, wherein the parameter set comprises at least one of a bitrate for video coding, a quantization parameter, a frame rate, a resolution, or a picture type.

30. The apparatus of any of clauses 17-29, wherein the processor is further configured to execute the instructions to cause the apparatus to:

generate a coded video stream comprising the parameter set and the region encoded.

31. The apparatus of clause 30, wherein the processor is further configured to execute the instructions to cause the apparatus to:

store the coded video stream and classes associated with at least one picture of the video sequence in a database, wherein the classes are searchable, and a portion of the coded video stream corresponding to any class is locatable by a class.

32. The apparatus of any of clauses 17-31, wherein the video sequence is captured by a surveillance device associated with the processor.

33. A computer-implemented method, comprising:

in response to receiving a region of a picture of a video sequence, determining a characteristic in the region, the region being independent of other regions of the picture for video coding;

determining a class associated with the region based on the characteristic, the class being selected from a plurality of classes; and encoding the region using a parameter set associated with the class, the parameter set being selected from a plurality of parameter sets for video coding at different quality levels.

34. The computer-implemented of clause 33, wherein the region is one of a slice of the picture, a tile of the picture, or the picture.

35. The computer-implemented of any of clauses 33-34, wherein the characteristic comprises a content characteristic associated with video contents in the region, and wherein the content characteristic comprises at least one of an object in the region, a scene in the region, or an environmental event in the region.

36. The computer-implemented of clause 35, wherein determining the characteristic in the region comprises:

determining the content characteristic using a machine learning technique, wherein the machine learning technique comprises at least one of an object detection technique, a semantic segmentation technique, or an instance segmentation technique.

37. The computer-implemented of clause 35, further comprising:

determining interest levels for classes of content characteristics based on an application scenario of the video sequence; and associating the plurality of parameter sets with the classes of content characteristics based on the interest levels.

38. The computer-implemented of any of clauses 33-37, wherein the characteristic comprises a motion characteristic associated with motion estimation of encoding or decoding the video sequence, and wherein the motion characteristic comprises at least one of a magnitude of a motion vector in the region or a total number of motion vectors in the region.

39. The computer-implemented of clause 38, wherein determining the characteristic in the region comprises:

determining that the motion characteristic exists in the region based on at least one of a determination that the magnitude of the motion vector exceeds a threshold magnitude or a determination that the total number of motion vectors exceeds a threshold number.

40. The computer-implemented of clause 38, further comprising:

determining ranges for classes of motion characteristics based on an application scenario of the video sequence; and associating the plurality of parameter sets with the classes of motion characteristics based on the ranges.

41. The computer-implemented of any of clauses 33-40, wherein the video sequence is a compressed video sequence, and the set of instructions that are executable by the one or more processors cause the device to further perform:

in response to receiving data of the region of the picture, decoding the region before determining the characteristic in the region.

42. The computer-implemented of clause 41, wherein the characteristic comprises a motion characteristic associated with motion estimation of encoding or decoding the video sequence, and wherein determining the characteristic in the region comprises:

determining motion data from decoding the region, wherein the motion data comprises a motion vector in the region; and determining the motion characteristic from the motion data.

43. The computer-implemented of any of clauses 33-42, wherein the class is associated with a priority level selected from a plurality of priority levels, the plurality of priority levels comprises a first priority level and a second priority level lower than the first priority level, the plurality of parameter sets comprises a first parameter set associated with the first priority level and a second parameter set associated with a second priority level, and the first parameter set is for video encoding at a first quality level, and the second parameter set is for video encoding at a second quality level lower than the first quality level.

44. The computer-implemented of any of clauses 33-43, wherein each of the plurality of parameter sets corresponds to one or more classes.

45. The computer-implemented of any of clauses 33-44, wherein the parameter set comprises at least one of a bitrate for video coding, a quantization parameter, a frame rate, a resolution, or a picture type.

46. The computer-implemented of any of clauses 33-45, further comprising:

generating a coded video stream comprising the parameter set and the region encoded.

47. The computer-implemented of clause 46, further comprising:
storing the coded video stream and classes associated with at least one picture of the video sequence in a database, wherein the classes are searchable, and a portion of the coded video stream corresponding to any class is locatable by a class.

48. The computer-implemented of any of clauses 33-47, wherein the video sequence is captured by a surveillance device associated with the processor.

In addition to implementing the above method by using computer-readable program codes, the above method can also be implemented in a form of a logic gate, a switch, an ASIC, a programmable logic controller, and an embedded microcontroller. Therefore, such a controller can be considered as a hardware component, and apparatuses included in the controller and configured to implement various functions can also be considered as structures inside the hardware component. Or, the apparatuses configured to implement various functions can even be considered as both software modules configured to implement the method and structures inside the hardware component.

This disclosure can be described in a general context of a computer-executable instruction executed by a computer, for example, a program module. Generally, the program module includes a routine, a program, an object, an assembly, a data structure, a class, or the like used for executing a specific task or implementing a specific abstract data type. Embodiments of the disclosure can also be implemented in distributed computing environments. In the distributed computing environments, a task is executed by using remote processing devices connected through a communications network. In the distributed computing environments, the program module can be located in local and remote computer storage media, including a storage device.

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as examples only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer-readable storage medium storing a set of instructions that are executable by one or more processors of a device to cause the device to perform a method comprising:

in response to receiving a region of a picture of a video sequence, determining a characteristic in the region, the region being independent of other regions of the picture for video coding;
determining a class associated with the region based on the characteristic, the class being selected from a plurality of classes;
encoding the region using a parameter set associated with the class, the parameter set being selected from a plurality of parameter sets for video coding at different quality levels;
generating a coded video stream comprising the parameter set and the region encoded; and
storing the coded video stream and classes associated with at least one picture of the video sequence in a database, wherein the classes are searchable, and a portion of the coded video stream corresponding to any class is locatable by a class.

2. The non-transitory computer-readable storage medium of claim 1, wherein the region is one of a slice of the picture or a tile of the picture.

3. The non-transitory computer-readable storage medium of claim 1, wherein the content characteristic further comprises an object in the region.

4. The non-transitory computer-readable storage medium of claim 1, wherein determining the characteristic in the region comprises:
determining the content characteristic using a machine learning technique, wherein the machine learning technique comprises at least one of an object detection technique, a semantic segmentation technique, or an instance segmentation technique.

5. The non-transitory computer-readable storage medium of claim 1, wherein the set of instructions that are executable by the one or more processors cause the device to further perform:
determining interest levels for classes of content characteristics based on an application scenario of the video sequence; and
associating the plurality of parameter sets with the classes of content characteristics based on the interest levels.

6. The non-transitory computer-readable storage medium of claim 1, wherein the characteristic further comprises a motion characteristic associated with motion estimation of encoding or decoding the video sequence, and wherein the motion characteristic comprises at least one of a magnitude of a motion vector in the region or a total number of motion vectors in the region.

7. The non-transitory computer-readable storage medium of claim 6, wherein determining the characteristic in the region comprises:
determining that the motion characteristic exists in the region based on at least one of a determination that the magnitude of the motion vector exceeds a threshold magnitude or a determination that the total number of motion vectors exceeds a threshold number.

8. The non-transitory computer-readable storage medium of claim 6, wherein the set of instructions that are executable by the one or more processors cause the device to further perform:
determining ranges for classes of motion characteristics based on an application scenario of the video sequence; and
associating the plurality of parameter sets with the classes of motion characteristics based on the ranges.

9. The non-transitory computer-readable storage medium of claim 1, wherein the video sequence is a compressed video sequence, and wherein the set of instructions that are executable by the one or more processors cause the device to further perform:

in response to receiving data of the region of the picture, decoding the region before determining the characteristic in the region.

10. The non-transitory computer-readable storage medium of claim 9, wherein the characteristic comprises a motion characteristic associated with motion estimation of encoding or decoding the video sequence, and wherein determining the characteristic in the region comprises:

determining motion data from decoding the region, wherein the motion data comprises a motion vector in the region; and determining the motion characteristic from the motion data.

11. The non-transitory computer-readable storage medium of claim 1, wherein the class is a first class, and a second class of the plurality of classes corresponds to the parameter set.

12. The non-transitory computer-readable storage medium of claim 1, wherein the video sequence is captured by a surveillance device associated with the processor.

13. An apparatus, comprising:
a memory configured to store instructions; and
at least one processor configured to execute the instructions to cause the apparatus to:

in response to receiving a region of a picture of a video sequence, determine a characteristic in the region, the region being independent of other regions of the picture for video coding;

determine a class associated with the region based on the characteristic, the class being selected from a plurality of classes;

encode the region using a parameter set associated with the class, the parameter set being selected from a plurality of parameter sets for video coding at different quality levels;

generate a coded video stream comprising the parameter set and the region encoded; and store the coded video stream and classes associated with at least one picture of the video sequence in a database, wherein the classes are searchable, and a portion of the coded video stream corresponding to any class is locatable by a class.

14. The apparatus of claim 13, wherein the at least one processor configured to execute the instructions to cause the apparatus to determine the characteristic in the region is further configured to execute the instructions to cause the apparatus to:

determine the content characteristic associated with the video contents in the region using a machine learning technique, wherein the machine learning technique comprises at least one of an object detection technique, a semantic segmentation technique, or an instance segmentation technique.

15. The apparatus of claim 13, wherein the at least one processor is further configured to execute the instructions to cause the apparatus to:

determine interest levels for classes of content characteristics based on an application scenario of the video sequence; and associate the plurality of parameter sets with the classes of content characteristics based on the interest levels.

16. The apparatus of claim 13, wherein the video sequence is a compressed video sequence, and wherein the processor is further configured to execute the instructions to cause the apparatus to:

in response to receiving data of the region of the picture, decode the region before determining the characteristic in the region.

17. A computer-implemented method, comprising:

in response to receiving a region of a picture of a video sequence, determining a characteristic in the region, the region being independent of other regions of the picture for video coding;

determining a class associated with the region based on the characteristic, the class being selected from a plurality of classes;

encoding the region using a parameter set associated with the class, the parameter set being selected from a plurality of parameter sets for video coding at different quality levels;

generating a coded video stream comprising the parameter set and the region encoded; and storing the coded video stream and classes associated with at least one picture of the video sequence in a database, wherein the classes are searchable, and a portion of the coded video stream corresponding to any class is locatable by a class.

18. The computer-implemented method of claim 17, wherein determining the characteristic in the region comprises:

determining the content characteristic associated with the video contents in the region using a machine learning technique, wherein the machine learning technique comprises at least one of an object detection technique, a semantic segmentation technique, or an instance segmentation technique.

19. The computer-implemented method of claim 17, further comprising:

determining interest levels for classes of content characteristics based on an application scenario of the video sequence; and associating the plurality of parameter sets with the classes of content characteristics based on the interest levels.

20. The computer-implemented method of claim 17, wherein the video sequence is a compressed video sequence, and wherein the method further comprises:

in response to receiving data of the region of the picture, decoding the region before determining the characteristic in the region.

* * * * *